US012475366B2

United States Patent
Exner et al.

(10) Patent No.: US 12,475,366 B2
(45) Date of Patent: Nov. 18, 2025

(54) UPDATING A NEURAL NETWORK MODEL ON A COMPUTATION DEVICE

(71) Applicant: SONY GROUP CORPORATION, Tokyo (JP)

(72) Inventors: Peter Exner, Malmö (SE); Hannes Bergkvist, Rydebäck (SE)

(73) Assignee: Sony Group Corporation, Tokyo (JP)

( * ) Notice: Subject to any disclaimer, the term of this patent is extended or adjusted under 35 U.S.C. 154(b) by 988 days.

(21) Appl. No.: 17/316,516

(22) Filed: May 10, 2021

(65) Prior Publication Data

US 2021/0390402 A1    Dec. 16, 2021

(30) Foreign Application Priority Data

Jun. 11, 2020 (SE) .................... 2050693-7

(51) Int. Cl.
*G06N 3/08* (2023.01)
*G06N 3/04* (2023.01)

(52) U.S. Cl.
CPC .............. *G06N 3/08* (2013.01); *G06N 3/04* (2013.01)

(58) Field of Classification Search
CPC ............ G06N 3/08; G06N 3/04; G06N 3/045
See application file for complete search history.

(56) References Cited

U.S. PATENT DOCUMENTS

| | | | |
|---|---|---|---|
| 8,793,205 B1 * | 7/2014 | Fisher | G06N 3/008 |
| 9,613,310 B2 | 4/2017 | Buibas | |
| 10,387,770 B2 | 8/2019 | Brothers | |
| 11,755,884 B2 * | 9/2023 | Eilert | G06N 3/098 |
| 2004/0162638 A1 * | 8/2004 | Solomon | G05D 1/0088 |
| 2019/0205744 A1 | 7/2019 | Mondello | |
| 2019/0205765 A1 | 7/2019 | Mondello | |
| 2019/0258924 A1 | 8/2019 | Hamidouche | |
| 2019/0392305 A1 | 12/2019 | Gu | |

(Continued)

FOREIGN PATENT DOCUMENTS

| | | |
|---|---|---|
| EP | 3447645 A1 | 2/2019 |
| WO | 2019185981 A1 | 10/2019 |
| WO | 2020046859 A1 | 3/2020 |

OTHER PUBLICATIONS

Kang, Yiping, et al. "Neurosurgeon: Collaborative intelligence between the cloud and mobile edge." (Year: 2017).*

(Continued)

*Primary Examiner* — Michelle T Bechtold
*Assistant Examiner* — Matiyas T Maru
(74) *Attorney, Agent, or Firm* — Tucker Ellis LLP (57) ABSTRACT

A method for updating a neural network model on a computation device. The method includes estimating a bandwidth for data download from a server device to the computation device; estimating a time point of available computation capacity of the computation device; computing a maximum partition size as a function of the bandwidth and the time point; and causing download of a selected partition of the neural network model from the server device to the computation device, the selected partition being determined based on the maximum partition size. The method enables the selected partition to be executed by the computation device upon downloading and thereby provides for seamless updating of the neural network model while it is being executed on the computation device.

18 Claims, 3 Drawing Sheets

(56) References Cited

U.S. PATENT DOCUMENTS

2021/0027166 A1* 1/2021 Gorokhov .............. G06N 3/082
2023/0259744 A1* 8/2023 Moradi ................... G06N 3/08

OTHER PUBLICATIONS

Luo, Liang, et al. "Parameter hub: a rack-scale parameter server for distributed deep neural network training." (Year: 2018).*
Shi, Wenqi, et al. "Improving device-edge cooperative inference of deep learning via 2-step pruning." (Year: 2019).*
Jeong, Hyuk-Jin, et al. "IONN: Incremental offloading of neural network computations from mobile devices to edge servers." (Year: 2018).*
Li, En, et al. "Edge AI: On-demand accelerating deep neural network inference via edge computing." (Year: 2019).*
Gao, et al. "Tetris: Scalable and efficient neural network acceleration with 3d memory." (Year: 2017).*
Chen, Yu-Hsin, et al. "Eyeriss: An energy-efficient reconfigurable accelerator for deep convolutional neural networks." (Year: 2016).*
Hinton et al., "Distilling the knowledge in a neural network." (Year: 2015).*
Kang et al. "Neurosurgeon: Collaborative intelligence between the cloud and mobile edge", (Year: 2017).*
Shi, et al. "Improving device-edge cooperative inference of deep learning via 2-step pruning." (Year: 2019).*
Luo, et al. "Parameter hub: a rack-scale parameter server for distributed deep neural network training." (Year: 2018).*
Wang et al., "Convergence of Edge Computing and Deep Learning: A Comprehensive Survey," IEEE Communication Surveys & Tutorials; 1907.08349v3; dated Jan. 28, 2020, 36 pages.
Office Action and Swedish Search Report from corresponding Swedish Application No. 2050693-7, mailed on Apr. 16, 2021, 5 pages.

* cited by examiner

UPDATING A NEURAL NETWORK MODEL ON A COMPUTATION DEVICE

RELATED APPLICATION DATA

This application claims the benefit of Swedish Patent Application No. 2050693-7, filed Jun. 11, 2020, the disclose of which is incorporated herein by reference in its entirety.

TECHNICAL FIELD

The present disclosure relates generally to neural networks and, more particularly, to updating a neural network model on a computation device.

BACKGROUND

Deployment of neural network models is becoming increasingly important, driven by new applications that benefit from machine learning and other capabilities of neural networks. Such applications include smart homes, smart cities, autonomous vehicles, and healthcare. Cloud-based deployment of neural networks has many advantages but faces challenges of maintaining privacy of user data and ensuring real-time responsivity in view of communication latency. In response to these challenges, efforts have been made to push the inference by neural networks from servers in the cloud to computation devices closer to the users, also known as local or edge computing.

When deploying a neural network model, it may be desirable to keep the model updated, for example to ensure that the model is capable of handling new scenarios with acceptable accuracy. At the same time, it may also be desirable to avoid or minimize downtime of the neural network model, for example in time-critical services. In cloud-based deployment, these needs may be met by deploying a service on two or more identical cloud servers which are updated in sequence to maintain responsivity during server update. This option is not available when updating the neural network model on a computation device. Thus, the needs for model update and downtime mitigation are in conflict with each other when the neural network model is operated on a computation device separate from a server.

SUMMARY

It is an objective to at least partly overcome one or more limitations of the prior art.

A further objective is to provide a technique of updating a neural network model on a computation device.

A yet further objective is to provide a technique enabling the responsivity of the neural network model to be maintained during updating.

One or more of these objectives, as well as further objectives that may appear from the description below, are at least partly achieved by a method of updating a neural network model on a computation device, a computation device, and a computer-readable medium according to the independent claim, embodiments thereof being defined by the dependent claims.

Some aspects of the present disclosure are based on the insight that an updated neural network (NN) model may be downloaded to a computation device in partitions. Further, some aspects of the present disclosure are based on the insight that the end-to-end time between start of download and inference for the updated NN model on the computation device may be reduced by clever selection of the size of the respective partition, and possibly by clever selection of the order in which the partitions are downloaded. Some aspects thereby define a technique of updating an NN model on a computation device from a server device while maintaining responsivity of the NN model during the update process. Maintaining responsivity infers that the NN model is capable of being executed on the computation device while it is being updated. By some aspects of the present disclosure, the updated NN model is allowed to operate on input data that is available at start of download and to provide output data when download is completed, or even before that.

Still other objectives, as well as features, embodiments, aspects and technical effects will appear from the following detailed description, the attached claims and the drawings.

BRIEF DESCRIPTION OF DRAWINGS

Embodiments will now be described in more detail with reference to the accompanying schematic drawings.

DETAILED DESCRIPTION OF EXAMPLE EMBODIMENTS

Embodiments will now be described more fully hereinafter with reference to the accompanying drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments. The term "compute", and derivatives thereof, is used in its conventional meaning and may be seen to involve performing a calculation involving one or more mathematical operations to produce a result, for example by use of a computer.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure. As used herein, the term "and/or" includes any and all combinations of one or more of associated listed elements.

Well-known functions or constructions may not be described in detail for brevity and/or clarity. Unless otherwise defined, all terms (including technical and scientific terms) used herein have the same meaning as commonly understood by one of ordinary skill in the art to which this disclosure belongs.

As used herein, "neural network model" (abbreviated NN model) refers to a connectionist system that comprises a collection of connected units or nodes (also known as "artificial neurons"), where the respective node receives one or more inputs from other nodes along its incoming connections and operates a dedicated function on the input(s). The dedicated function is commonly denoted "activation function" and may, for example, be a non-linear function of the sum of the input(s). The connections between nodes may be assigned a respective weight, which may increase or decrease the strength of the respective input at a node. One or more nodes may also be assigned a bias, which may be applied to delay triggering of the activation function. Typically, nodes are aggregated into layers, where different layers may perform different kinds of transformations on their inputs. Thus, layers may be defined within a NN model based on their functionality. Signals travel from the first layer (the input layer) to the last layer (the output layer), possibly after traversing one or more layers multiple times. The NN model may also comprise a so-called gating mechanism, which may cause the NN model to selectively skip a part of the model, for example one or more layers, based on previous activations of nodes, for example in a previous layer. In some implementations, this is also known as "skip connection" or "shortcut".

The NN model is capable of being "trained" to perform a task. Such training may be performed in advance of deployment of the NN model and/or during deployment. In the training, control parameters of the NN model are adjusted to achieve a desired output. These control parameters comprise at least one of weights and biases. Thus, a NN model may be seen to comprise a static part, which defines the structure of the model in terms of its nodes and connections between nodes, and a dynamic part, which defines values of the control parameters for the static part.

An NN model as used herein is not limited to any particular type of model. Non-limiting examples of NN models include Perceptron (P), Feed Forward (FF), Radial Basis Network (RBN), Deep Feed Forward (DFF), Recurrent Neural Network (RNN), Long/Short term Memory (LSTM), Gated Recurrent unit (RCU), Auto Encoder (AE), Variational AE (VAE), Denoising AE (DAE), Sparse AE (SAE), Markov Chain (MC), Hopfield Network (HN), Boltzmann Machine (BM), Restricted BM (RBM), Deep Belief Network (DBN), Deep Convolutional Network (DCN), Deconvolutional Network (DN), Deep Convolutional Inverse Graphics Network (DCIGN), Generative Adversarial Network (GAN), Liquid State Machine (LSM), Extreme Learning Machine (ELM), Echo State Network (ESN), Deep Residual Network (DRN), Kohonen Network (KN), Support Vector Machine (SVM), and Neural Turing Machine (NTM), or any combination thereof. When one or more NN models are applied to perform a machine learning task, the resulting model is generally referred to as a Machine Learning (ML) model.

As used herein, "inference" refers to execution of an NN model to provide output data from input data.

Before presenting embodiments in detail, an example deployment of an NN model in the context of autonomous vehicles will be briefly presented to demonstrate the advantage and/or need of maintaining responsivity of the NN model during update. In the example deployment, a fleet of autonomous vehicles are connected through a wireless network. The vehicles continuously execute one or more NN models to perform several machine-leaning (ML) tasks in order to navigate. Assuming that the vehicles are road vehicles, such as cars or trucks, the ML tasks may include lane detection. Although the deployed ML model for lane detection may be robust in scenarios that are anticipated and tested during development, environmental conditions such as weather and unexpected roadwork may degrade the accuracy of the ML model when deployed. To mitigate such degradation, one or more leading vehicles of the fleet may be configured to improve their ML model, for example by re-training the ML model on-the-go using, for example, self-supervised online learning algorithms. Thereby, the ML model in the leading vehicle(s) is continuously or intermittently refined. Other vehicles in the fleet may benefit from having their ML models updated in correspondence with the refined ML model in the leading vehicle(s) so as to be able to quickly respond to potentially hazardous situations. The conventional approach would be to download the refined ML model in its entirety on the other vehicles, which then are operable to execute the refined ML model. Depending on implementation, the download may be initiated by the cloud or by the leading vehicle(s). It is conceivable that the other vehicles may have to interrupt inference while downloading the refined ML model, which would render the other vehicles incapable of performing lane detection for a period of time. If the other vehicles have enough storage and processing capacity, they may execute their existing ML model in parallel with downloading the refined ML model. Even in such a parallel approach, the other vehicles are unable to execute the refined ML model during download. It is realized that it is desirable to reduce the end-to-end time from start of download of an updated ML model to inference by the updated ML model.

Embodiments relate to techniques for updating an NN model on a computation device from a server device while maintaining responsivity of the NN model during the update process. To maintain responsivity, embodiments enable the updated NN model to be executed on the computation device while it is being downloaded. This will enable the updated NN model to operate on input data that is available at start of download and to provide output data when download is completed, or even before that. It is realized that such embodiments will effectively reduce or even minimize the end-to-end time.

Embodiments will be described with reference to an example system shown in FIG. 1. The system comprises a computation device ("computer") 10 which is configured to execute an NN model 11 based on input data ID to generate output data OD. The input data ID is generated, online (in real-time) or offline, by an input system 12 which is connected to, or included in, the computer 10. The input system 12 may, for example, comprise one or more sensors of any type. The output data OD is provided to a receiving system 13 which is connected to, or included in, the computer 10. The receiving system 13 may, for example, store, process or present the output data OD.

Figure 1:
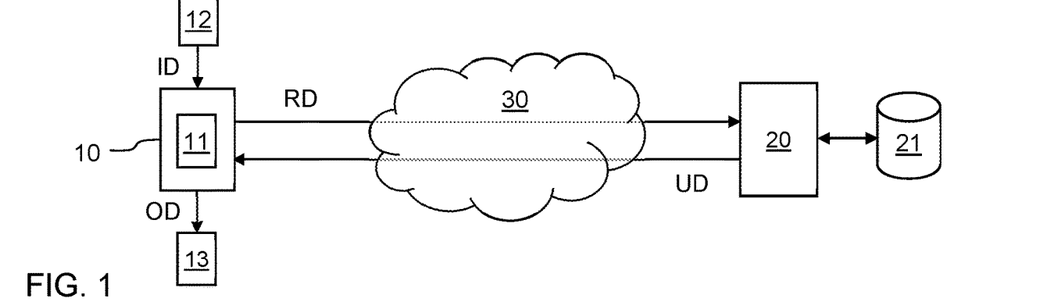
FIG. 1 illustrate a computation device in communication with a server device during update of a neural network model.

The system in FIG. 1 further comprises a server device ("server") 20 which is connected, by wire or wirelessly, to a storage device 21 that stores at least part of a current version of the NN model 11. The server 20 and the computer 10 are operable to communicate over a wireless network 30. The wireless network may be a WAN, LAN or PAN or any combination thereof. In some embodiments, the server 20 is operable to provide update data UD for the NN model 11 in the computer 10 in response to request data RD received from the computer 10.

In some embodiments, the server 20 is an edge-computer or a cloud-computer, and the computer 10 is an edge-computer. In the above-described example of autonomous vehicles, the server 20 may be in a leading vehicle, and the computer 10 may be in one of the other vehicles.

Figure 2:
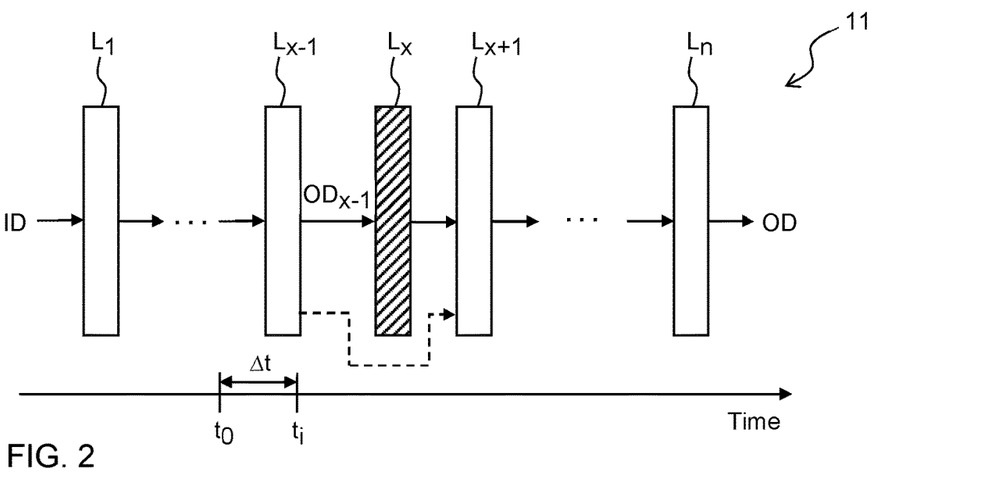
FIG. 2 illustrate an example neural network model during update in accordance with embodiments.

FIG. 2 is a schematic illustration of an example NN model during inference. In the illustrated example, the NN model 11 comprises layers $L_1$-$L_n$, where the input layer $L_1$ receives input data, ID, and the output layer $L_n$ produces output data, OD. The layers $L_1$-$L_n$ are executed in sequence, where the respective layer downstream of the input layer L1 operates on intermediate output data provided by the preceding layer. This is exemplified for layer $L_x$ which operates on intermediate output data $OD_{x-1}$ from preceding layer $L_{x-1}$.

Embodiments are based on the insight that an updated NN model may be downloaded in partitions, and that the end-to-end time between start of download and inference for the updated NN model may be reduced by clever selection of the partitions and the size of the respective partition.

This insight will be explained with reference to the example in FIG. 2. Consider a scenario in which layer $L_x$ should be downloaded from the server 20 and updated in the NN model 11 on the computer 10. FIG. 2 indicates a time point $t_i$ at which execution of layer $L_{x-1}$ is completed and execution of layer $L_x$ may be started. Assuming that the size of the update for layer Lx is known or can be estimated, the required time $\Delta t$ for downloading the update may be estimated based on this size and the current bandwidth of the wireless connection 30 between the computer 10 and the server 20. Knowing $t_i$ and $\Delta t$, a suitable time point $t_0$ for starting the download may be computed. It is realized that by starting the download of the update for layer $L_x$ at time point to, or earlier, it is ensured that layer $L_x$ has been updated when $OD_{x-1}$ from layer $L_{x-1}$ is available. This means that the layer $L_x$ may be seamlessly updated and executed.

It should be noted that the methodology shown in FIG. 2 may not only be used for updating a single layer in a NN model, but could be used for updating plural layers, or a subdivision (part) of one or more layers. Such a subdivision may be spatial and may be applied to one or more layers in the height dimension (vertical in FIG. 2) and/or in the width dimension (horizontal in FIG. 2). Alternatively or additionally, the subdivision may be used for updating a channel of the NN model, or part of a channel. Channels are defined by some NN models for processing a specific part of the input data, ID. One example is a Convolutional Neural Network (CNN) for processing image data from color images, where the CNN may define one channel for each color channel of the image data.

It may also be noted that the methodology in FIG. 2 may be applied to NN models that are capable of skipping layers, for example by the above-mentioned gating mechanism. Such updating is represented by a dashed arrow in FIG. 2, where the NN model during execution determines that layer $L_x$ may be skipped so that $OD_{x-1}$ from layer $L_{x-1}$ is instead processed by layer $L_{x+1}$. In this example, the required download time $\Delta t$ may instead be estimated based on the size of the update of layer $L_{x+1}$ and the bandwidth of the wireless connection 30, whereupon a suitable time point $t_0$ for starting the download may be computed based on $t_i$ and $\Delta t$.

Figure 3:
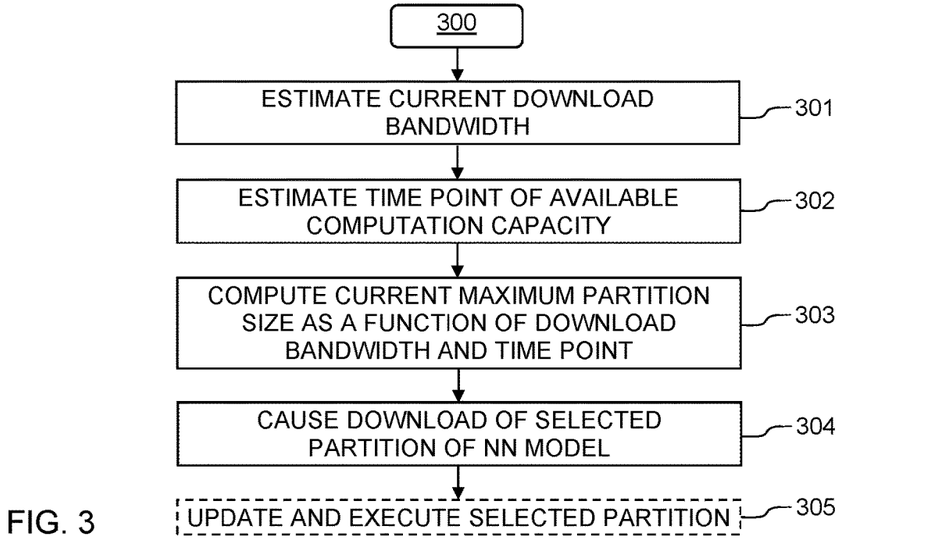
FIG. 3 is a flowchart of an example method of updating a neural network model in accordance with embodiments.

FIG. 3 is a flow chart of an example method 300 for updating an NN model based on the methodology in FIG. 2. For clarity, the method 300 will be described with reference to the system in FIG. 1. Step 301 estimates a bandwidth for data download from the server 20 to the computer 10. Step 302 estimates a time point of available computation capacity of the computer 10. Step 303 computes a maximum partition size, MAX, as a function of the bandwidth and the time point. Step 304 causes download of a selected partition of the NN model 11 from the server 20 to the computer 10, with the selected partition being determined based on MAX.

Generally, by computing MAX and causing download of a selected partition of the NN model, the example method 300 enables the selected partition to be executed when it has been downloaded by the computer 10, as indicated by step 305 in FIG. 3. Such a step 305 may comprise, after the selected partition has been downloaded, updating the NN model 11 by adding the selected partition to replace a corresponding partition of the NN model 11.

In some embodiments, the selected partition comprises values of the above-mentioned control parameters, or part thereof, for a subset of the NN model 11. As understood from the foregoing, the subset may be one or more layers, a subdivision of one or more layers, one or more channels, or a subdivision of one or more channels of the NN model 11.

In the context of FIG. 2, the method 300 may be performed at a current time, represented by $t_0$, to estimate an upcoming time point of available computation capacity, represented by $t_i$, and compute MAX for the time period $\Delta t$ between $t_0$ and $t_i$, given the download bandwidth. It is realized that if the selected partition is determined so as to be substantially equal to or smaller than MAX, the selected partition will be available for execution at the computer 10 at the time point $t_i$ when the computer 10 has available computation capacity. Thereby, the example method 300 enables a seamless download, update and execution of the selected partition of the NN model 11.

It is realized that the method 300 may be performed at any time point while the NN model 11 is being executed on the computer 10. In the example of FIG. 2, assuming that the size of the update of layer $L_x$ (or $L_{x+1}$ if $L_x$ is skipped) is not larger than MAX, the update of may be downloaded and ready for execution when execution of layer $L_{x-1}$ is completed.

Reverting to step 301, the term "bandwidth" designates a current capacity for data transmission of per unit time, for example given as bits or bytes per second, colloquially known as "download speed". Step 301 may apply any available technique for estimating the bandwidth, including so-called passive or active measurement methods. Passive measurement methods may be implemented within the network 30 to act as observers and usually do not interfere with other traffic. Examples of passive measurement tools include MRTG and IPMON. By use of passive measurements, step 301 may obtain a current bandwidth from an observer in the network 30. Active measurement methods apply a probing scheme to measure the bandwidth and may be implemented on end devices for the data traffic to be measured, for example the server 20 and the computer 10. Thus, step 301 may involve performing an active measurement to estimate a current bandwidth.

Reverting to step 302, it is to be noted that the time point of available computation capacity (denoted "free capacity time point", FCTP in the following), as estimated at a current time point, depends not only on ongoing inference at the current time and any inference scheduled to be performed subsequent to the current time, but also on all other tasks affecting the computational load of the computer 10 from the current time point and onwards. Thus, step 302 may comprise estimating the FCTP based on a current and/or projected computational load of the computer 10.

Reverting to step 303, MAX represents an amount of data and may, for example, be given as a number of bits or bytes. In some embodiments, MAX is computed as a function of a product of the bandwidth and an available time interval (cf. Δt in FIG. 2), from a selected time point to the FCTP. The selected time point may be the current time point or an estimated time point when an ongoing and/or scheduled download is completed.

In some embodiments, as understood from the foregoing, execution of one or more existing partitions of the NN model 11 has been completed on the computer 10 at the estimated FCTP. This is typically the case when the updating, for example in accordance with the method 300, is performed while the NN model 11 is being executed. Such existing partitions are denoted "completed partitions" in the following.

In some embodiments, the selected partition is determined as a function of the completed partitions at the FCTP. The computer 10, when estimating the FCTP, is also capable of determining the progress of the execution of the NN model 11 at FCTP and thereby identify the completed partitions at FCTP. When the completed partitions have been identified, the selected partition may be determined to ensure that it indeed can be executed after download, in that the required input for the selected partition is available at FCTP. Reverting to FIG. 2, the computer 10 will inherently know that $OD_{x-1}$ will be available at $t_i$, so that layer $L_x$ or $L_{x+1}$ is capable of being executed. This may seem trivial in the simplified example of FIG. 2 but provides a significant technical advantage when downloading selected partitions with a more complex dependence on output from completed partitions.

Figure 4A:
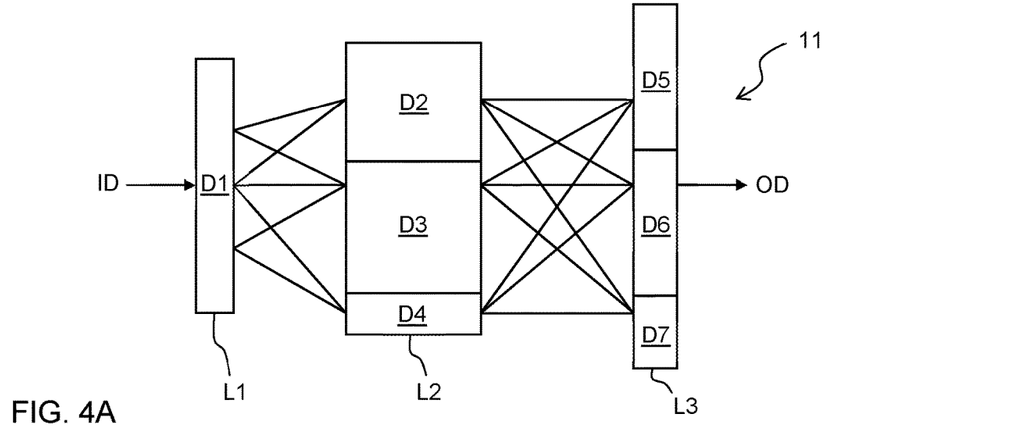
FIG. 4A is a diagram of an example partitioning of a neural network model.

FIG. 4A shows another example of an NN model 11 having an input layer L1, an output layer L3 and an intermediate layer L2. In the illustrated example, the NN model 11 is comprises a plurality of predefined partitions D1-D7 and has a predefined dependence between the partitions D1-D7, indicated by connecting lines. Thus, each connecting line represents an output from one partition used as input by another partition. In the illustrated example, input layer L1 has one partition D1, intermediate layer L2 is vertically subdivided into three partitions D2-D4, and output layer L3 is vertically subdivided into three partitions D5-D7. Execution of the NN model 11 on input data ID produces output data OD and involves execution of all of partitions D1-D7.

Figure 4B:
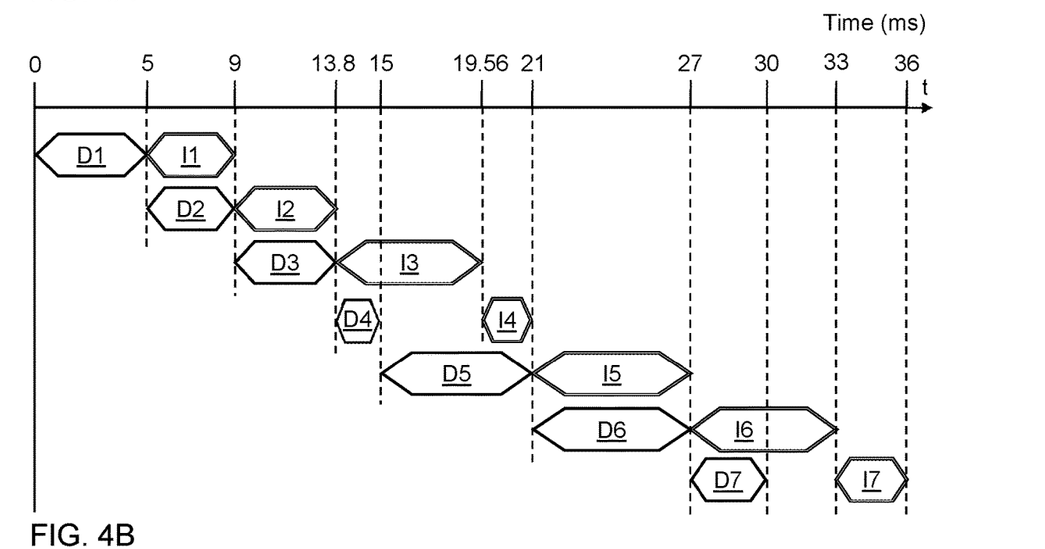
FIG. 4B is a timing diagram of an example implementation of updating the neural network model based on the example partitioning in FIG. 4A.

FIG. 4B is a timing diagram for an example updating procedure of the NN model 11 in FIG. 4A, by use of the method 300 in FIG. 3. The timing diagram illustrates the download of a respective partition by a hexagon with a single-line perimeter, and the execution (inference) of the respective partition by a hexagon with a double-line perimeter. The inference of the respective partition D1-D7 is further indicated by I1-I7. The illustrated example in FIG. 4B presumes that the updating procedure is performed by downloading updates for the partitions D1-D7 in FIG. 4A. It is thus understood that D1-D7 in FIG. 4B represents updates for the partitions D1-D7 in FIG. 4A. The example in FIG. 4B presumes the following sizes of the updates D1-D7 in bytes (B): 500, 400, 480, 120, 600, 600, 300. The example further presumes that the bandwidth is maintained at 100 kB/s during the updating procedure.

The updating procedure starts at t=0 by downloading D1, which is completed at t=5 ms, whereupon D1 is updated and executed. At or before t=5 ms, the updating procedure estimates that execution of D1, i.e. I1, is completed at t=9 ms, which defines the FCTP (step 302). Thus, the available time interval (Δt) is 4 ms (from t=5 ms to t=9 ms), which may be converted into a current MAX of 400 B (step 303), given that the bandwidth is 100 kB/s. As seen in FIG. 4A, the output of D1 is used as input by the partitions D2-D4, which means that any one D2-D4 may be executed when I1 is completed. However, D3 exceeds the current MAX and will not be downloaded at FCTP. Thus, the selected partition for download at t=9 ms may be either D2 or D4. Given that D2 is larger than D4, D2 may be downloaded to minimize undesirable gaps between executions of downloaded partitions. After its download, D2 is executed (I2 in FIG. 4B). The updating procedure then repeats method 300 in the same way to download D3 when I2 is completed. After its download, at t=13.8 ms, D3 is executed (I3 in FIG. 4B). At or before t=13.8 ms, the updating procedure estimates that I3 will be completed at t=19.56 ms (FCTP), corresponding to a current MAX of 576 B. However, at t=13.8 ms, only D4 is available for download and execution, given the dependence between the partitions. Specifically, execution of D5-D7 requires output from each of D2-D4. Thus, D4 is downloaded during I3. D4 may be scheduled for execution (I4) directly after download, if the computer 10 has sufficient computation capacity to perform I4 in parallel with I3. In the illustrated example, I4 is instead scheduled after completion of I3. At or before t=15 ms, the updating procedure estimates that ongoing and scheduled inferences, i.e. I3 and I4, will be completed at t=21 ms (FCTP), corresponding to a current MAX of 600B. Given the dependence between the partitions, all of D5-D7 are available for download and execution. In the illustrated example, D5 is selected for download and scheduled for execution when I4 is completed. The updating procedure then repeats method 300 in the same way to sequentially download and execute D6 and D7. After download of D7, the update is completed and normal operation of the NN model 11 is resumed.

As understood from FIG. 4B, repeated execution of the method 300 enables the network model 11 to be executed at the same time as it is updated, by downloading a sequence of selected partitions of the NN model 11 and scheduling the selected partitions for execution in synchronization with the available computation capacity of the computer 10. In the example of FIG. 4B, during the updating procedure, the NN model 11 is capable of processing input data (ID in FIG. 4A), which is provided to the NN model at t=5 ms, so as to provide corresponding output data (OD in FIG. 4A) at t=36 ms. Thus, the end-to-end time from start of download to inference ("total inference time") is 36 ms, which may be compared to the approach of first downloading and updating D1-D7 (30 ms) and then performing I1-I7 (31 ms), which results in a total inference time of 61 ms.

Based on the foregoing examples, it is realized that technical advantages may be achieved if the selected partition, to be downloaded in step 304, is determined as a function of the dependence within the NN model 11 on the output from one or more completed partitions at the estimated FCTP. Such technical advantages include enabling a short total inference time during update of the NN model 11 and improved use of available computation capacity in the computer 10.

Although not shown in FIG. 4B, it is realized that the updating procedure, subject to the dependence within the NN model 11, may enable a partition in one layer to be executed before all partitions in previous layers have been executed.

In some embodiments, the selected partition is determined so as to operate on the output generated by the completed partition(s) at FCTP. Such an embodiment is shown in FIG. 4B. For example, when each of D2-D4 is scheduled for download, they are known to operate on output data made available by the completed partition D1. Similarly, when each of D5-D7 is scheduled for download, they are known to operate on output data made available by the completed partitions D2-D4. Clearly, this results a short total inference time and improved use of available computation capacity.

It may also be noted that corresponding technical advantages may be achieved if the selected partition, to be downloaded in step 304, is determined as a function of the available computation capacity of the computer 10 at the estimated FCTP. For example, the updating procedure may select, for download in step 304, two or more smaller partitions with a combined size that substantially matches the current MAX, if the computation capacity of the computer 10 is deemed to allow for the two or more partitions to be executed at least partly in parallel at the estimated FCTP. Such embodiments enable shorter total inference time and better use of available computation capacity.

In some embodiments, exemplified in FIG. 4B, the method 300 is repeated at consecutive time points to download a respective selected partition such that the selected partitions of the NN model are downloaded in a substantially continuous sequence, i.e. with minimum gaps between downloads. This ensures that the NN model 11 is updated in a minimum time period.

In some embodiments, exemplified in FIG. 4B, the method 300 is repeated at consecutive time points to download a respective selected partition and schedule execution of the selected partitions in sequence, and optionally also in parallel, to achieve a substantially continuous inference, i.e. with minimum delays between sections of inference. This ensures a minimum response time of the NN model 11 during update.

In some embodiments, the minimum response time may be achieved by repeatedly performing the method 300 at consecutive current time points to update the NN model 11 on the computer 10, and by configuring step 304 to, at the respective current time point, cause download of partition data of a size that is substantially equal to the MAX at the respective current time point (as determined by step 303). The partition data comprises the selected partition, and optionally one or more further selected partitions. Effectively, this means that the partition data has such a size that download of the partition data will finish at the same time as computing capacity on the computer 10 becomes available.

In some embodiments, the method 300 further comprises evaluating the output from the completed partition(s) to identify one or more other partitions to be excluded from execution, and determining the selected partition while excluding the other partition(s). Such embodiments are applicable to an NN model with a gating mechanism that enables dynamic skipping of one or more parts of the NN model, for example as illustrated in FIG. 2. A technical advantage of excluding the other partition(s) when determining the selected partition is that the other partition(s) are neither downloaded nor executed, which reduces the total inference time. This also means that the other partition(s) of the NN model 11 will not be updated. However, the other partition(s) may be updated at subsequent execution of the NN model 11 whenever the other partition(s) are not excluded by the gating mechanism.

In some embodiments, for example as described with reference to FIGS. 4A-4B, the selected partition, to be downloaded in step 304, is determined among a plurality of predefined partitions of the NN model 11 and based on a predefined dependence between the predefined partitions.

In other embodiments, the selected partition is determined by dynamically partitioning the NN model 11 on demand. Such embodiments have the advantage that the size of the selected partition(s) may be tailored to the current MAX, as determined by step 303. This may improve the ability of the updating procedure to achieve a minimum total inference time and optimal use of available computation capacity.

Generally, the selected partition may represent a single node in the NN model 11. However, in practice, the minimum size of the selected partition may equal to the smallest executable unit on the computer 10. As an example, the computer 10 may utilize a GPU for matrix multiplications during execution of the NN model 11. In such a GPU, the smallest executable unit is limited by the capability of a single core, such as a stream processor, and the size of the cache associated with the single core. The maximum size of the selected partition is similarly limited to the available computing capacity on the computer 10.

The method 300 may be implemented in different ways on the computer 10. Two embodiments will be described with reference to FIGS. 5A-5B, which represent steps performed by the computer 10 and the server 20.

Figure 5A:
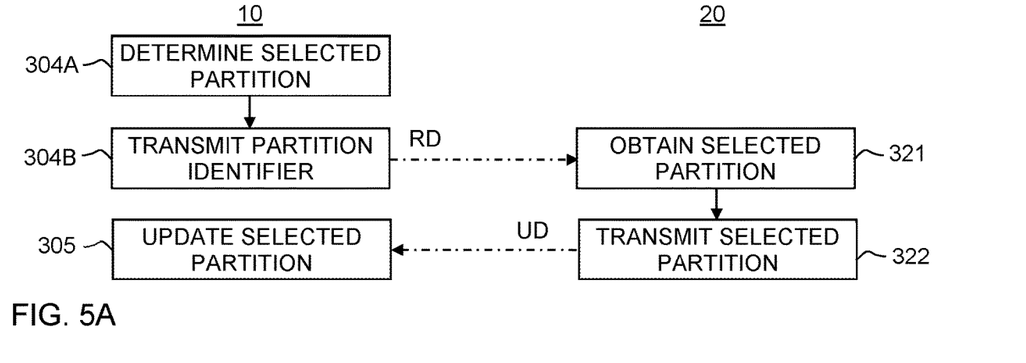
FIGS. 5A-5B are flow charts of example processes in a computation device and a server device when updating a neural network model in accordance with embodiments.

In one embodiment, exemplified in FIG. 5A, the computer 10 determines the selected partition and causes the download of the selected partition by transmitting data indicative of the selected partition to the server 20. FIG. 5A presumes that the computer 10 has performed steps 301-303 in advance of a step 304A, which is part of step 304 comprises determining the selected partition. Step 304A may be performed as described hereinabove. In step 304B, which is also part of step 304, the computer 10 transmits request data RD (cf. FIG. 1) comprising an identifier of the selected partition to the server 20, for example over network 30. The server 20 receives the identifier and retrieves the corresponding update (step 321), for example from the storage device 21 (FIG. 1), and transmits update data UD (cf. FIG. 1) comprising the update to the computer 10, for example over network 30 (step 322). In step 305, the computer 10 receives the update, updates the selected partition accordingly, and schedules the updated partition for execution. The example in FIG. 5A presumes that the computer 10 and the server 20 share a system of identifiers that uniquely identifies partitions in the NN model 11, be they predefined or the result of dynamic partitioning. The example in FIG. 5A further presumes that the computer 10 knows the size of the update for the respective partition. For example, the computer 10 may associate a nominal update size with the respective partition.

Figure 5B:
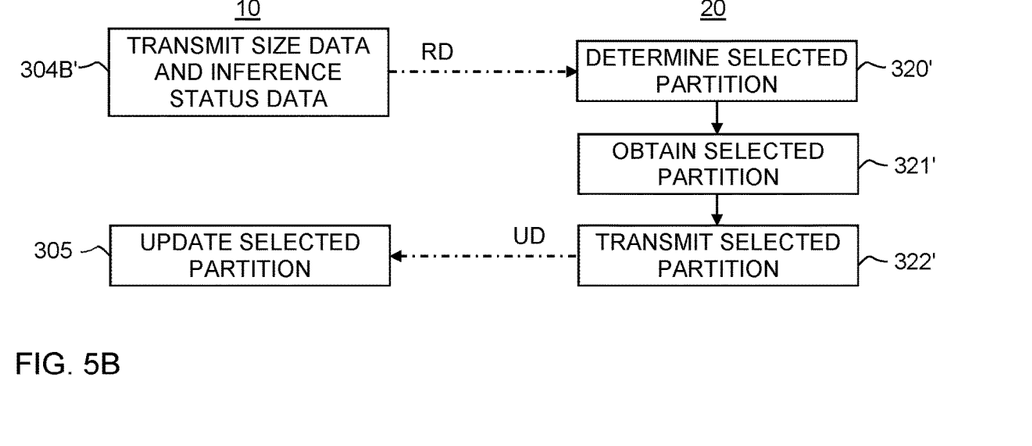

In one embodiment, exemplified in FIG. 5B, the computer 10 transmits, to the server 10, size data indicative of the MAX and inference status data indicative of completed partition(s) at FCTP. In this embodiment, the server 20 determines the selected partition. FIG. 5B presumes that the computer 10 has performed steps 301-303 in advance of a step 304B', which is part of step 304 and in which the computer 10 transmits request data RD (cf. FIG. 1) comprising the size data and the inference status data to the server 20, for example over network 30. The server 20 receives the request data RD and determines the selected partition in accordance with the previous disclosure, based on the size data and inference status data (step 320'). The server 20 retrieves the update of the selected partition (step 321'), for example from the storage device 21 (FIG. 1), and transmits update data UD (cf. FIG. 1) comprising the update to the computer 10, for example over network 30 (step 322'). In step 305, the computer 10 receives the update, updates the selected partition accordingly, and schedules the updated partition for execution. Like in FIG. 5A, the computer 10 and the server 20 may share a system of identifiers that uniquely identifies partitions in the NN model 11. In FIG. 5B, communication of size data and inference status data may decrease the MAX of the network 30 and thereby increase the total inference time. However, compared to FIG. 5A, the example in FIG. 5B offloads the computer 10 by relocating the determination of the selected partition to the server 10.

Figure 6:
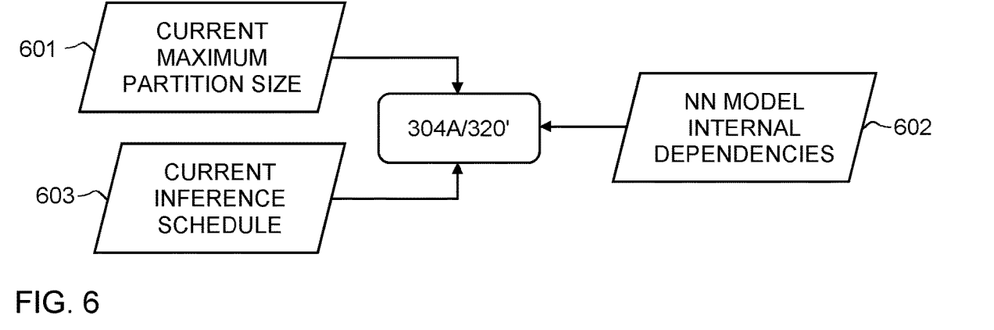
FIG. 6 is a functional diagram of example input data to a partition selection function used in updating a neural network model in accordance with embodiments.

FIG. 6 is a schematic block diagram of input data for step 304A or step 320' in accordance with some embodiments. The input data comprises the current maximum partition size 601, MAX (from step 303), structural data 602 defining internal dependencies of the NN model, and a current inference schedule 603. The structural data 602 may define connections between nodes and/or subsets of nodes in the NN model. The current inference schedule 603 may identify the partitions that have been scheduled for execution by the computer device 10 at any current time point. Based on the structural data 602 and the current inference schedule 603, step 304A or step 320' may identify the completed partition(s) at FCTP and nodes/subsets that are connected to the completed partition(s), to determine the selected partition based on these nodes/subsets. It is realized that the inference status data transmitted in step 304B' in FIG. 5B may comprise at least part of the current inference schedule 603.

Figure 7:
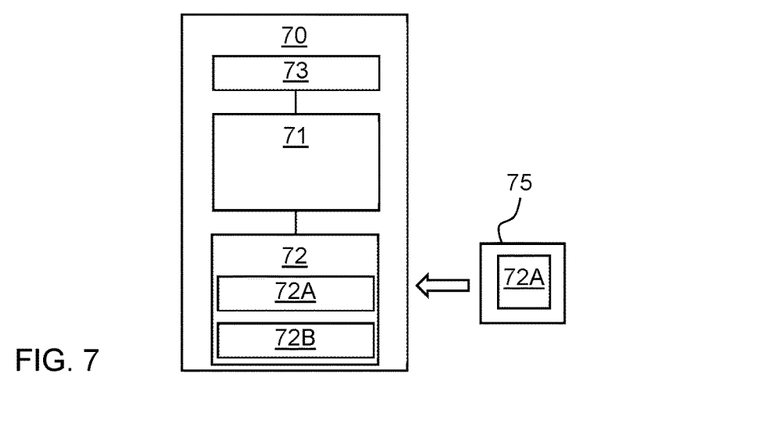
FIG. 7 is a block diagram of a machine that may implement any one of the methods, procedures and functions described herein.

The structures and methods disclosed herein may be implemented by hardware or a combination of software and hardware. In some embodiments, the hardware comprises one or more software-controlled computer resources. FIG. 7 schematically depicts such a computer resource 70, which comprises a processing system 71, computer memory 72, and a communication interface or circuit 73 for input and/or output of data. The communication interface 73 may be configured for wired and/or wireless communication, for example with the server 20. The processing system 71 may, for example, include one or more of a CPU ("Central Processing Unit"), a DSP ("Digital Signal Processor"), a GPU ("Graphics Processing Unit"), a microprocessor, a microcontroller, an ASIC ("Application-Specific Integrated Circuit"), a combination of discrete analog and/or digital components, or some other programmable logical device, such as an FPGA ("Field Programmable Gate Array"). A control program 72A comprising computer instructions is stored in the memory 72 and executed by the processing system 71 to implement logic that performs any of the methods, procedures, functions or steps described in the foregoing. The control program 72A may be supplied to the computer resource 70 on a computer-readable medium 75, which may be a tangible (non-transitory) product (e.g. magnetic medium, optical disk, read-only memory, flash memory, etc.) or a propagating signal. As indicated in FIG. 7, the memory 72 may also store control data 72B for use by the processing system 71, for example the static and dynamic parts of the NN model 11, the structural data 602, the current inference schedule 603, the nominal update size for different partitions, identifiers for partitions, etc.

While the subject of the present disclosure has been described in connection with what is presently considered to be the most practical embodiments, it is to be understood that the subject of the present disclosure is not to be limited to the disclosed embodiments, but on the contrary, is intended to cover various modifications and equivalent arrangements included within the spirit and the scope of the appended claims.

Further, while operations are depicted in the drawings in a particular order, this should not be understood as requiring that such operations be performed in the particular order shown or in sequential order, or that all illustrated operations be performed, to achieve desirable results.

In the following, clauses are recited to summarize some aspects and embodiments as disclosed in the foregoing.

Clause 1: A method of updating a neural network model (11) on a computation device (10), said method comprising:
  estimating (301) a bandwidth for data download from a server device (20) to the computation device (10);
  estimating (302) a time point of available computation capacity of the computation device (10);
  computing (303) a maximum partition size as a function of the bandwidth and the time point; and
  causing (304) download of a selected partition of the neural network model (11) from the server device (20) to the computation device (10), said selected partition being determined based on the maximum partition size.

Clause 2: The method of clause 1, wherein the selected partition is determined to have a size substantially equal to or less than the maximum partition size.

Clause 3: The method of clause 1 or 2, which is performed while the neural network model (11) is being executed on the computation device (10).

Clause 4: The method of any preceding clause, further comprising, upon said download, updating and executing (305) the selected partition of the neural network model (11) on the computation device (10).

Clause 5: The method of clause 4, wherein execution of the selected partition is initiated at the time point of available computation capacity.

Clause 6: The method of any preceding clause, wherein the maximum partition size is computed as a function of a product of the bandwidth and a time interval (Δt) from a selected time to the time point.

Clause 7: The method of any preceding clause, wherein one or more existing partitions of the neural network model (11) have been executed on the computation device (10) at said time point.

Clause 8: The method of clause 7, wherein the selected partition is determined as a function of the one or more existing partitions.

Clause 9: The method of clause 7 or 8, wherein the selected partition is determined as a function of a dependence within the neural network model on output generated by the one or more existing partitions.

Clause 10: The method of any one of clauses 7-9, wherein the selected partition is determined so as to operate on the output generated by the one or more existing partitions.

Clause 11: The method of any one of clauses 7-10, further comprising: evaluating the output generated by the one or more existing partitions to identify one or more partitions to be excluded from execution, wherein the selected partition is determined while excluding the one or more partitions.

Clause 12: The method of any one of clauses 7-11, wherein said causing (304) the download comprises: transmitting (304A'), by the computation device (10) to the server device (20), size data indicative of the maximum partition size and status data indicative of the one or more existing partitions that have been executed at the time point.

Clause 13: The method of any preceding clause, further comprising: determining (304A) the selected partition by the computation device (10), wherein said causing (304) the download comprises: transmitting (304B), by the computation device (10) to the server device (20), data indicative of the selected partition.

Clause 14: The method of any preceding clause, wherein the selected partition is determined as a function of the available computation capacity of the computation device (10) at the time point.

Clause 15: The method of any preceding clause, wherein the selected partition is determined among a plurality of predefined partitions of the neural network model (11) and based on a predefined dependence between the predefined partitions.

Clause 16: The method of any one of clauses 1-14, wherein the selected partition is determined by dynamically partitioning the neural network model (11) on demand.

Clause 17: The method of any preceding clause, which is performed by the computation device (10).

Clause 18: The method of any preceding clause, wherein the selected partition comprises at least part of one or more layers or channels of the neural network model (11).

Clause 19: The method of any preceding clause, which is repeatedly performed at consecutive current time points to update the neural network model (11) on the computation device (10), and wherein said causing (304), at a respective current time point, results in download of partition data of a size substantially equal to the maximum partition size estimated at the respective current time point, said partition data comprising the selected partition, and optionally one or more further selected partitions.

Clause 20: A computation device comprising a communication circuit (73) for communicating with a server device (20), and logic (71, 72) to control the computation device to perform the method in accordance with any one of clauses 1-19.

Clause 21: A computer-readable medium comprising computer instructions (72A) which, when executed by a processing system (71), cause the processing system (71) to perform the method in accordance with any one of clauses 1-19.

What is claimed is:

1. A method of updating a neural network model on a computation device, said method comprising:
    estimating a bandwidth for data download from a server device to the computation device;
    estimating a time point of available computation capacity of the computation device;
    computing a maximum partition size as a function of the bandwidth and the time point; and
    causing download of a selected partition of the neural network model from the server device to the computation device, said selected partition being determined based on the maximum partition size; and
    updating and executing the selected partition of the neural network model, downloaded from the server, on the computation device,
    wherein updating the selected partition includes replacing a corresponding partition of the neural network model on the computation device with the selected partition downloaded from the server device, and
    wherein the method is performed while the neural network model is being executed on the computation device.

2. The method of claim 1, wherein the selected partition is determined to have a size substantially equal to or less than the maximum partition size.

3. The method of claim 1, wherein execution of the selected partition is initiated at the time point of available computation capacity.

4. The method of claim 1, wherein the maximum partition size is computed as a function of a product of the bandwidth and a time interval from a selected time to the time point.

5. The method of claim 1, wherein one or more existing partitions of the neural network model have been executed on the computation device at said time point.

6. The method of claim 5, wherein the selected partition is determined as a function of the one or more existing partitions.

7. The method of claim 5, wherein the selected partition is determined as a function of a dependence within the neural network model on output generated by the one or more existing partitions.

8. The method of claim 5, wherein the selected partition is determined so as to operate on the output generated by the one or more existing partitions.

9. The method of claim 5, further comprising: evaluating the output generated by the one or more existing partitions to identify one or more partitions to be excluded from execution, wherein the selected partition is determined while excluding the one or more partitions.

10. The method of claim 5, wherein said causing the download comprises: transmitting, by the computation device to the server device, size data indicative of the maximum partition size and status data indicative of the one or more existing partitions that have been executed at the time point.

11. The method of claim 1, further comprising: determining the selected partition by the computation device, wherein said causing the download comprises: transmitting, by the computation device to the server device, data indicative of the selected partition.

12. The method of claim 1, wherein the selected partition is determined as a function of the available computation capacity of the computation device at the time point.

13. The method of claim 1, wherein the selected partition is determined among a plurality of predefined partitions of the neural network model and based on a predefined dependence between the predefined partitions.

14. The method of claim 1, wherein the selected partition is determined by dynamically partitioning the neural network model on demand.

15. The method of claim 1, which is performed by the computation device.

16. The method of claim 1, which is repeatedly performed at consecutive current time points to update the neural network model on the computation device, and wherein said causing, at a respective current time point, results in download of partition data of a size substantially equal to the maximum partition size estimated at the respective current time point, said partition data comprising the selected partition, and optionally one or more further selected partitions.

17. A computation device comprising a communication circuit for communicating with a server device, and logic to control the computation device to perform the method in accordance with claim 1.

18. A non-transitory computer-readable medium comprising computer instructions which, when executed by a processing system, cause the processing system to perform the method in accordance with claim 1.

* * * * *